(12) United States Patent
Sattler

(10) Patent No.: US 10,837,517 B2
(45) Date of Patent: Nov. 17, 2020

(54) TOOTHED BELT DRIVE

(71) Applicant: ContiTech Antriebssysteme GmbH, Hannover (DE)

(72) Inventor: Heiko Sattler, Wedemark (DE)

(73) Assignee: ContiTech Antriebssysteme GmbH, Hannover (DE)

( * ) Notice: Subject to any disclaimer, the term of this patent is extended or adjusted under 35 U.S.C. 154(b) by 343 days.

(21) Appl. No.: 16/109,345

(22) Filed: Aug. 22, 2018

(65) Prior Publication Data

US 2018/0363728 A1 Dec. 20, 2018

Related U.S. Application Data

(63) Continuation of application No. PCT/EP2016/081637, filed on Dec. 19, 2016.

(30) Foreign Application Priority Data

Feb. 22, 2016 (DE) .......................... 10 2016 001 972

(51) Int. Cl.
*F16G 1/28* (2006.01)
*F16H 7/16* (2006.01)
(Continued)

(52) U.S. Cl.
CPC ............... *F16G 1/28* (2013.01); *F16H 7/023* (2013.01); *F16H 7/16* (2013.01); *F16H 55/171* (2013.01)

(58) Field of Classification Search
CPC .......... F16G 1/28; F16H 7/023; F16H 55/171; F16H 7/02; B41J 19/005
(Continued)

(56) References Cited

U.S. PATENT DOCUMENTS 3,083,583 A * 4/1963 Szonn .................... B65G 23/06
474/153
3,117,460 A * 1/1964 Traeger ................... F16H 7/023
474/153
(Continued)

FOREIGN PATENT DOCUMENTS

EP 2803879 A1 11/2014
JP H07180747 A 7/1995
(Continued)

OTHER PUBLICATIONS

International search report dated Apr. 19, 2017 for international application PCT/EP2016/081637 on which this application is based.

*Primary Examiner* — Henry Y Liu
(74) *Attorney, Agent, or Firm* — David L. Cate; Gregory Adams

(57) ABSTRACT

Toothed belt drive having one toothed belt and at least two, preferably helically geared, toothed pulleys, wherein the toothed belt wraps the toothed pulleys over a part-region of the circumference of the latter and the teeth of the toothed belt mesh in the tooth gaps of the toothed pulleys, wherein the air gap $E_S$ or $E_{S(mk)}$ that relates to the nominal pitch P and results from the difference between the width es of the tooth gaps of the respective toothed pulley and the width $e_R$ of the teeth of the toothed belt is configured at the mean height of the teeth, depending on the tooth count $z_R$ of the toothed pulleys and on the tooth count z of the toothed pulleys, or on the tooth counts $z_k$ of the smaller toothed pulley and on $z_g$ of the larger toothed pulley, respectively.

11 Claims, 5 Drawing Sheets

(51) Int. Cl.
*F16H 7/02* (2006.01)
*F16H 55/17* (2006.01)

(58) Field of Classification Search
USPC .................................. 474/205, 152, 153
See application file for complete search history.

(56) References Cited

U.S. PATENT DOCUMENTS

| | | | | |
|---|---|---|---|---|
| 3,744,330 A * | 7/1973 | Sugimoto | ............... | F16H 7/023 474/153 |
| 3,756,091 A * | 9/1973 | Miller | ...................... | F16G 1/28 474/153 |
| 3,924,481 A * | 12/1975 | Gregg | ...................... | F16G 1/28 474/153 |
| 3,969,946 A * | 7/1976 | Gregg | ...................... | F16G 1/28 474/153 |
| 3,977,265 A * | 8/1976 | Worley | ..................... | F16G 1/28 474/153 |
| 4,037,485 A * | 7/1977 | Hoback | .................... | F16G 1/28 474/148 |
| 4,041,789 A * | 8/1977 | Hoback | .................... | F16G 1/28 474/148 |
| 4,233,852 A * | 11/1980 | Bruns | ................. | F16H 55/171 474/153 |
| 4,337,056 A * | 6/1982 | Bruns | ...................... | F16G 1/28 474/153 |
| 4,403,979 A * | 9/1983 | Wujick | ................ | F16H 55/171 474/153 |
| 4,427,403 A * | 1/1984 | Kanamori | ................. | F16G 1/28 474/153 |
| 4,468,211 A * | 8/1984 | Hoshiro | ................. | F16H 7/023 474/153 |
| 4,515,577 A * | 5/1985 | Cathey | ................ | F16H 7/023 474/204 |
| 4,586,915 A * | 5/1986 | Cathey | ..................... | F16G 1/28 474/205 |
| 4,604,080 A * | 8/1986 | Mizuno | .................. | F16H 7/023 474/153 |
| 4,605,389 A * | 8/1986 | Westhoff | .................. | F16G 1/28 474/153 |
| 4,614,509 A * | 9/1986 | Tangorra | ................ | F16H 7/023 474/205 |
| 4,650,443 A * | 3/1987 | Wetzel | ..................... | F16G 1/28 474/153 |
| 4,679,999 A * | 7/1987 | Wetzel | ..................... | F16G 1/28 474/153 |
| 4,696,665 A * | 9/1987 | Macchiarulo | ......... | F16H 55/171 474/153 |
| 4,722,721 A * | 2/1988 | Wetzel | ..................... | F16G 1/28 474/153 |
| 4,840,606 A * | 6/1989 | Wetzel | ..................... | F16G 1/28 474/153 |
| 4,840,608 A * | 6/1989 | Araki | ....................... | F16G 1/28 474/153 |
| 4,878,886 A * | 11/1989 | Kitabayashi | .............. | F16G 1/28 474/204 |
| 4,915,674 A * | 4/1990 | Tanaka | ..................... | F16G 1/28 474/153 |
| 4,929,221 A * | 5/1990 | Tanaka | ..................... | F16G 1/28 474/205 |
| 4,993,998 A * | 2/1991 | Tanaka | ..................... | F16G 1/28 474/205 |
| 5,015,218 A * | 5/1991 | Macchiarulo | ............. | F16G 1/28 474/152 |
| 5,026,327 A * | 6/1991 | White, Jr. | ............ | B29D 29/103 474/152 |
| 5,046,993 A * | 9/1991 | Macchiarulo | ........... | F16H 7/023 474/205 |
| 5,145,188 A * | 9/1992 | Bartelt | ..................... | F16G 1/28 474/153 |
| RE34,485 E * | 12/1993 | Tanaka | .................... | F16H 7/023 474/205 |
| 6,485,384 B1 * | 11/2002 | Ochiai | .................. | B41J 19/005 474/153 |
| 7,887,446 B2 * | 2/2011 | Hironaka | ................ | F16H 7/023 474/205 |
| 8,070,634 B2 * | 12/2011 | Gaynor | ................ | F16H 55/171 474/153 |
| 8,312,959 B1 * | 11/2012 | Schneider | ................ | F16H 7/16 180/444 |
| 9,670,985 B2 * | 6/2017 | Sekiguchi | ................ | F16G 1/10 |
| 9,950,768 B2 * | 4/2018 | Osaki | ........................ | F16G 1/14 |
| 10,161,487 B2 * | 12/2018 | Pease | ........................ | F16G 1/08 |
| 10,436,286 B2 * | 10/2019 | Matsukawa | ................ | F16G 5/20 |

FOREIGN PATENT DOCUMENTS

| | | |
|---|---|---|
| JP | 2000320626 A | 11/2000 |
| JP | 2001065648 A | 3/2001 |
| JP | 2006153249 A | 6/2006 |
| JP | 2015502285 A | 1/2015 |
| WO | 2014024377 A1 | 7/2016 |

\* cited by examiner

TOOTHED BELT DRIVE

CROSS REFERENCE TO RELATED APPLICATION

This application is a continuation application of international patent application PCT/EP2016/081637, filed Dec. 19, 2016, designating the United States and claiming priority from German application 10 2016 001 972.7, filed Feb. 22, 2016, and the entire content of both applications is incorporated herein by reference.

FIELD OF THE INVENTION

The invention relates to a toothed belt drive having one toothed belt and at least two, preferably helically geared, toothed pulleys, wherein the toothed belt has at least one drive side, provided with a toothed profile, and the toothed pulleys have a toothed profile that is complementary to that of the toothed profile of the belt, wherein the toothed belt wraps the toothed pulleys over a part-region of the circumference of the latter and the teeth of the toothed belt mesh in the tooth gaps of the toothed pulleys.

BACKGROUND OF THE INVENTION

One of the challenges when configuring such toothed belt drives is in providing toothed belt drives that are as silent as possible and in minimizing as far as possible the generation of noise. Running noises result in particular from the constructive and geometric conditions in the meshing of the teeth with the toothed belt pulley and from the vibrations and oscillations created on account thereof in the belt run. Even while a reduction in noise is already possible by changing from spur-geared toothed belt drives to helically-geared toothed belt drives, the noise emissions still present in the latter are nevertheless significant and undesirable.

U.S. Pat. No. 7,887,446 discloses a helically-geared toothed belt drive in which noise and vibrations are to be minimized in that the play (backlash "D"), that is, the backlash between the helically-geared toothed belt and the toothed pulley is set to a specific ratio to the tooth pitch at a specific tooth inclination angle and a predefined width of the toothed belt. EP 2 803 879 A1 proposes similar measures, in particular for the reduction in noise in the case of toothed belt drives in electrical power steering assemblies. Here too, the tooth play is set so as to depend on the tooth width and the tooth height.

The configuration of the profile of toothed pulleys as the counterpart of toothed belts and the profile of the latter in helically-geared toothed belt drives thus always envisages a certain degree of play, that is, a certain degree of "backlash", not least in order to guarantee a certain capability of the belt to be displaced in relation to the toothed pulley in the circumferential direction in order to compensate for production tolerances of the belt and for variable tensile forces and for dissimilar pitch lengths resulting from the latter in the the wrapped arc. It is the superordinate objective herein for the play to be configured such that an unimpeded run-in of the toothed belt into both toothed pulleys is achieved in order for the generation of noise from air and impact to be minimized.

However, the measures known in the state of the art for reducing the noise from air and impact in the case of toothed belt drives are no longer adequate in the case of an interaction between comparatively large and small toothed pulleys, in particular thus in toothed belt drives for comparatively large gear ratios. In particular in the case of toothed belt drives which have high positive/negative gear ratios and for instance considerably reduce the revolutions from the drive input to the drive output, the measures mentioned are ineffective per se not least because the meshing conditions when running into a small toothed pulley/sprocket differ significantly from the meshing conditions when running into a large toothed pulley.

SUMMARY OF THE INVENTION

It is an object of the invention to provide a belt drive which in the case of toothed pulleys of dissimilar diameters/tooth counts and also in the case of comparatively high gear ratios runs with as little noise as possible and without shocks when meshing, and generates few vibrations and oscillations in the belt run even at high revolutions.

This object can, for example, be achieved by a toothed belt drive including: a toothed belt having a plurality of teeth and at least one drive side provided with a first toothed profile; at least two toothed pulleys each having a circumference and defining tooth gaps; the toothed pulleys each having a second toothed profile that is complementary to the first toothed profile; the toothed belt being configured to wrap the at least two toothed pulleys over a part-region of the circumference of each of the at least two toothed pulleys; the teeth of the toothed belt being configured to mesh in the tooth gaps of the at least two toothed pulleys; wherein an air gap $E_S$ that relates to a nominal pitch P and results from a difference between a width $e_S$ of the tooth gaps of the respective one of the at least two toothed pulleys and a width $e_R$ of the teeth of the toothed belt at a mean height of the teeth, depending on a tooth count $z_R$ of the toothed belt and on a tooth count z of the respective one of the at least two toothed pulleys, is configured such that $$E_S = e_S - e_R = \left[C_S + \frac{0.004 \cdot z}{z_R - z}\right] \cdot P$$

wherein $C_S$ is predefined as a constant for a standard backlash in the case of toothed belt drives in a range of $0.06 \leq C_S \leq 0.08$.

The object can, for example, also be achieved via a toothed belt drive including: a toothed belt having a plurality of teeth and at least one drive side provided with a first toothed profile; at least two toothed pulleys each having a circumference and defining tooth gaps; the at least two toothed pulleys each having a second toothed profile that is complementary to the first toothed profile; the toothed belt being configured to wrap the at least two toothed pulleys over a part-region of the circumference of each of the at least two toothed pulleys; the teeth of the toothed belt being configured to mesh in the tooth gaps of the at least two toothed pulleys; wherein the at least two toothed pulleys have dissimilar diameters and include a smaller toothed pulley and a larger toothed pulley; and, at the smaller toothed pulley an air gap $E_{S(mk)}$ that relates to a nominal pitch P and results from a difference between a width $e_{Smk}$ of the tooth gaps of the smaller toothed pulley and a width $e_R$ of the teeth of the toothed belt at a mean height of the teeth, depending on a tooth count $z_R$ of the toothed belt and on a tooth count $z_k$ of the smaller toothed pulley and on $z_g$ of the larger toothed pulley, is configured such that:

$$E_{S(mk)} = e_{Smk} - e_R = \left[C_S + \frac{0.004 \cdot z}{z_R - z_k} + \left(\frac{z_g}{z_k} - 1\right) \cdot \frac{C_{mk} \cdot 2\pi \cdot u}{P \cdot z_g - 2\pi u}\right] \cdot P$$

wherein $C_S$ is predefined in a range of $0.06 \leq C_S \leq 0.08$ and $C_{mk}$ is predefined as a modified constant for the air gap in the case of toothed belt drives in a range of $1.00 \leq C_{mk} \leq 2.00$.

According to the first embodiment, the backlash $E_S$ that relates to the nominal pitch P and results from the difference between the width $e_S$ of the tooth gaps of the respective toothed pulley and the width $e_R$ of the teeth of the toothed belt in or at the mean height of the teeth, depending on the tooth count $z_R$ of the toothed belt and on the tooth count z of the toothed pulley, is configured such that $$E_S = e_S - e_R = \left[C_S + \frac{0.004 \cdot z}{z_R - z}\right] \cdot P$$

wherein $C_S$ is predefined as a constant for the standard backlash in the case of toothed belt drives in a range of $0.06 \leq C_S \leq 0.08$. This constant for the standard backlash can be used substantially always when the toothed pulleys either have comparatively large and approximately identical diameters, or differ only slightly in terms of the diameter and the tooth count.

The nominal pitch P of the toothed belt and toothed pulley herein is the pitch at the height of the effective cord line, that is, on that radius that is established by the center of the cords (cord center) of the toothed belt that wraps the toothed pulley. The nominal pitch line, or the nominal pitch arc, respectively, thus lies radially outside the teeth of the toothed pulley.

Setting the backlash according to embodiments of the invention reduces the impact noise and oscillations in the belt run in that the ratio of the tooth counts of the belt and the belt pulley as well as the dissimilar curvatures of a belt, proceeding from the production thereof and thereafter in operation with a belt pulley are considered. The backlash at each toothed pulley is configured in the best possible manner while utilizing and being based on all tooth counts participating in the drive. The configuration principle disclosed, instead of applying empirical across-the-board parameters, reflects the actual effective technical mechanisms.

In the prior art, specifically the gear ratios calculated from the belt tooth count and the tooth counts of small and large toothed pulleys, such as are generally used, for example, in helically-geared dual-pulley drives for steering assemblies, have not been adequately considered up until now. Such belt drives can have high gear ratios and significantly reduce, often to approximately one third, the revolutions from the drive input to the drive output.

Whenever small and comparatively large toothed pulleys are considered in interaction, thus when the toothed pulleys have significantly dissimilar diameters/tooth counts, that is, in the case of comparatively high gear ratios in a toothed belt drive, the object is, for example, achieved by the configuration according to the second embodiment.

At the smaller toothed pulley, the air gap $E_{S(mk)}$ herein that relates to the nominal pitch P and results from the difference between the width $e_{Smk}$ of the tooth gaps of the respective smaller toothed pulley and the width $e_R$ of the teeth of the toothed belt at the mean height of the teeth, depending on the tooth count $z_R$ of the toothed belt and on the tooth counts $z_k$ of the smaller toothed pulley and on $z_g$ of the larger toothed pulley, is configured such that:

$$E_{S(mk)} = e_{Smk} - e_R = \left[C_S + \frac{0.004 \cdot z}{z_R - z_k} + \left(\frac{z_g}{z_k} - 1\right) \cdot \frac{C_{mk} \cdot 2\pi \cdot u}{P \cdot z_g - 2\pi u}\right] \cdot P$$

wherein $C_S$ is predefined in a range of $0.06 \leq C_S \leq 0.08$ and $C_{mk}$ is predefined as a further modified constant for the backlash in the case of toothed belt drives in a range of $1.00 \leq C_S \leq 2.00$.

The individual parameters can best be identified and explained when viewed together with the FIGS. described in more detail hereunder.

In the formulas and drawings:

$C_{mk}$ is the constant of the modified backlash of the small pulley;
$C_S$ is the constant of the standard backlash;
$E_{Smk}$ is the modified backlash of the small pulley;
$E_S$ is the standard backlash;
$e_{Smk}$ is the gap width of the modified small toothed pulley;
$e_S$ is the gap width of the toothed pulley'
$e_R$ is the tooth width of the belt;
P is the nominal pitch;
u is the effective line spacing;
z is the tooth count of a toothed pulley;
$z_g$ is the tooth count of the large toothed pulley;
$z_k$ is the tooth count of the small toothed pulley;
$z_R$ is the tooth count of the toothed belt.

By contrast to the previous prior art, the gearing ratio is taken into account by the configuration according to the invention of the backlash, or the play, respectively, according to the first embodiment, wherein an optimal low-noise operation is guaranteed when a toothed belt running in can settle in a shock-free manner into the corresponding tooth gap on each toothed pulley. Shock-free running in also means that the gap of a toothed pulley at the crown circle/meshing circle is not yet sufficiently large for receiving the next meshing pitch (as opposed to the nominal pitch) running in without any misalignment even when the multiple deviations from the belt meshing pitch to the pulley meshing pitch in the already occupied wrap arc have been added up and the backlash is partially exhausted.

Furthermore, the conditions differ fundamentally at each pulley run-in, both in terms of the pitch length from the longitudinal rigidity and the locally prevalent belt run force, as well as in terms of the toothed pulley diameter. The toothed belt nominal pitch is established in the production of the toothed belt on the respective mold, but the meshing pitch, lying below the cord center and spaced apart from the latter by the effective line spacing, decreases as the toothed pulley becomes smaller. It follows therefrom that an enlarged backlash is set in the case of small toothed pulleys. The "cord center" herein is the center, or the central plane, respectively, of the reinforcement elements which are embedded within the toothed belt body, or are vulcanized into the belt, respectively, and as longitudinal traction members absorb the substantial tensile forces of the belt. The cord center thus determines the effective direction of the tensile force when the toothed belt meshes with the toothed belt pulley.

One advantageous embodiment of the invention lies in that one of the toothed pulleys or the smaller toothed pulley has a pitch circle diameter of $d \leq 45$ mm. It has been demonstrated in practice that the effect of noise reduction is particularly pronounced in the case of these diameters. The same applies to a further advantageous embodiment which consists of one of the toothed pulleys or the smaller toothed pulley having a tooth count between 20 and 60.

As has already been alluded to above, such a toothed belt drive can be particularly positively used in electric power-steering gearboxes, in particular configured with a helical gear, in motor vehicles.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
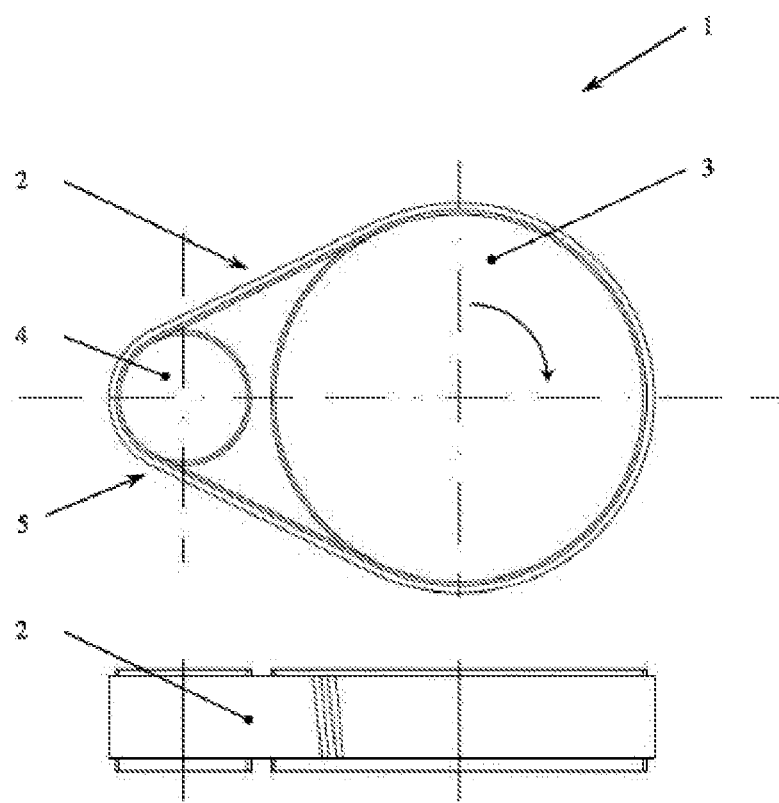
FIG. 1 shows a helically geared toothed belt drive with a high reduction gear ratio, in the form of a diagram.

FIG. 1 shows a helically-geared toothed belt drive 1 with a high reduction gear ratio, having one toothed belt 2, one large toothed pulley 3 as the drive output pulley, and one small toothed pulley 4 as the drive input pulley. The toothed belt 2, by way of the drive side thereof that is provided with a toothed profile, runs onto the small toothed pulley 4 in the run-in region 5. The small toothed pulley 4 has a toothed profile that is complementary to the toothed profile of the belt, wherein the toothed belt wraps the toothed pulleys over a part-region of their circumference, and the teeth of the toothed belt mesh in the tooth gaps of the toothed pulleys. The same applies in an analogous manner to the large toothed pulley 3.

Figure 2:
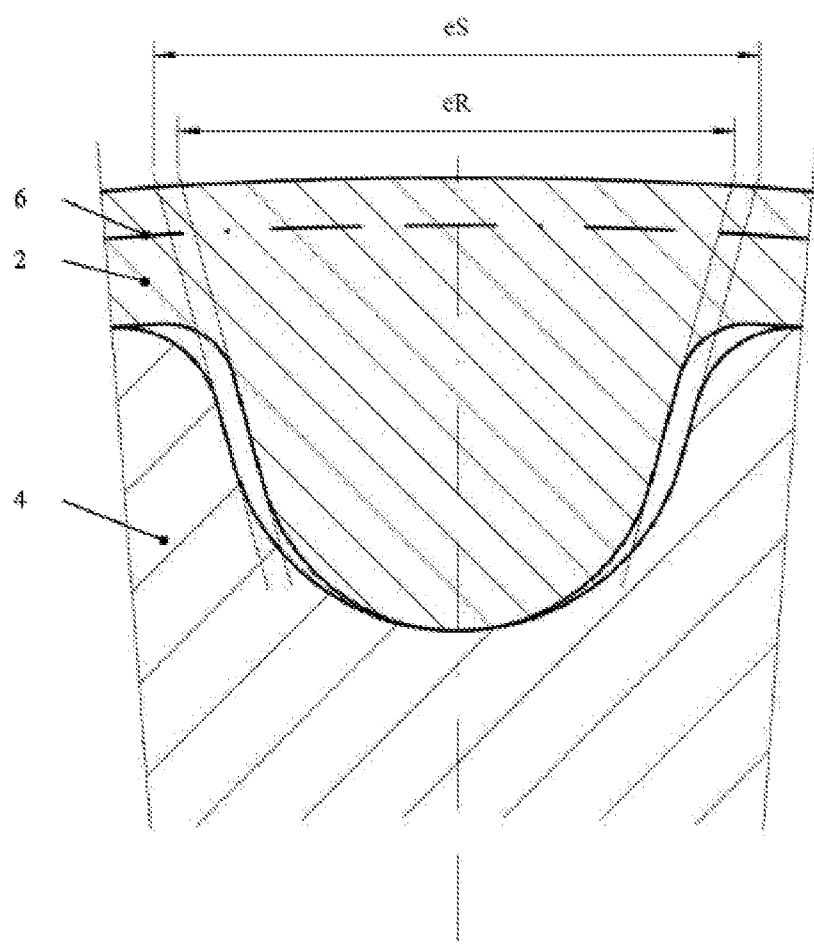
FIG. 2 shows the meshing conditions prevalent between a toothed belt and a toothed pulley in the configuration according to an embodiment of the invention.

FIG. 2 in an enlarged illustration shows the meshing conditions prevalent between the toothed belt 2 and the toothed pulley 4 in the configuration according to a first embodiment. Illustrated here are the parameters $e_S$, that is, the gap width of the toothed pulley, and $e_R$, that is, the toothed width of the belt, and the cord center 6, that is, the central plane of the reinforcement elements that are vulcanized into the toothed belt, also referred to as the effective cord line.

Figure 3:
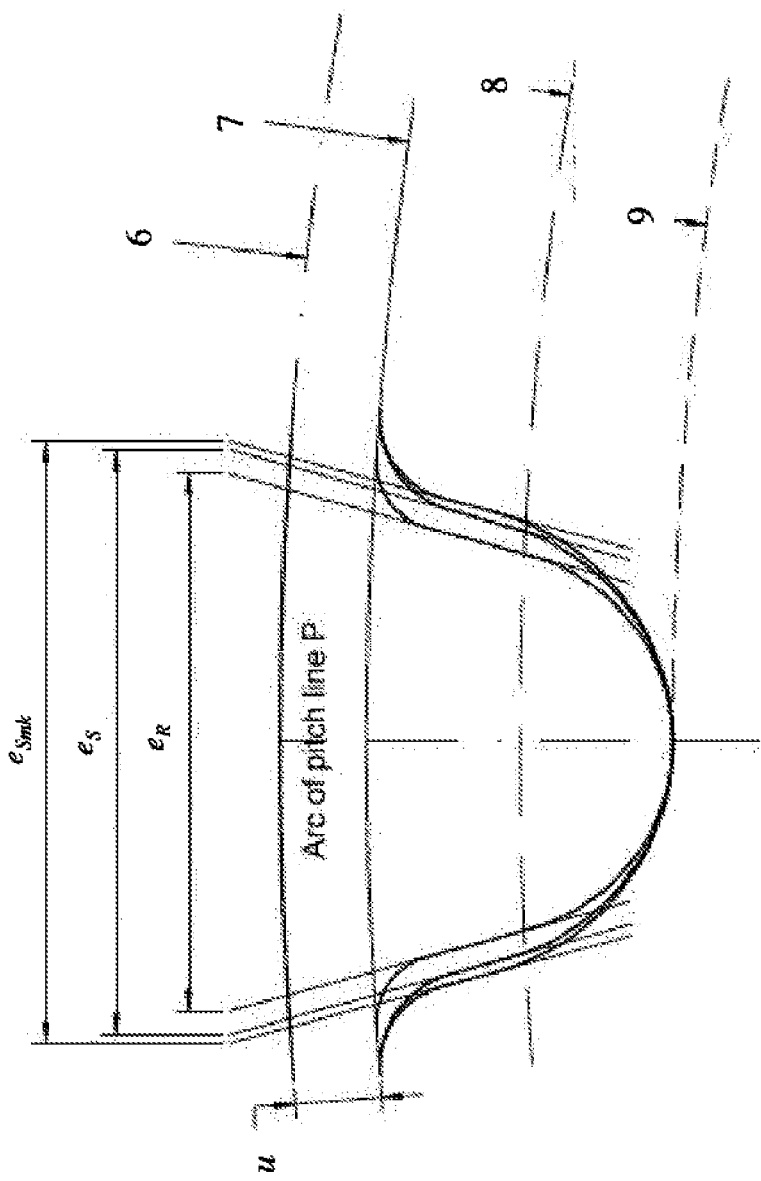
FIG. 3 shows the meshing conditions prevalent between the toothed belt and a small toothed pulley in the configuration according to an embodiment of the invention.

This cord center or effective cord line 6 is to be found again in FIG. 3 which shows the meshing conditions prevalent in a configuration according to a second embodiment. To be seen here is also the gap width of the modified small toothed pulley $e_{Smk}$ which is illustrated here for highlighting the configuration according to the invention for toothed drive with a comparatively high gear ratio as compared to the gap width of the toothed pulley $e_S$ from FIG. 2. It can be clearly seen in this illustration that the backlash $E_{S(mk)}=e_{Smk}-e_R$ for the comparatively small toothed wheel in the configuration according to the second embodiment (smaller toothed wheel, higher gear ratio, dissimilar tooth counts and diameters) is in this case larger than the backlash $E_S=e_S-e_R$ in the configuration as per the first embodiment, the latter being directed substantially toward the configuration of comparatively large toothed wheels.

The respective backlash, also referred to as tooth play or, internationally, as "backlash", is established by the radius 8 of the mean tooth height, herein relating to the nominal pitch P of the toothed pulley and the toothed belt.

The effective line spacing u which as a parameter is to be found again in the formula associated with the subject matter of the second embodiment is also illustrated in FIG. 3. The effective line spacing u describes the difference between the crown circle radius 7 of the (herein smaller) toothed pulley 4 and the radius of the cord center 6 in the wrap arc.

Overall, for an operation that is as noiseless as possible, the backlash of each toothed pulley is thus fundamentally aligned by way of two partially opposing effects, on account of which the production state of the toothed belt is also taken into account. This takes place in that a type of "standard rule" takes into account the tooth count of the belt and the shape of the latter on a drum as a result of the production process of the belt, as well as the tooth count of the respective pulley. As has already been illustrated above, this configuration according to the invention is particularly suitable for the configuration of low-noise belt drives when the toothed pulleys either have relatively large and approximately identical diameters, or differ only slightly in terms of the diameter and the tooth count. The decisive factor in terms of noise is the unimpeded meshing at the crown circle of the toothed pulley such that the meshing pitch at the crown circle is indeed significant.

Assuming that production variances in the production of the toothed belt add up in the pitch of the toothed belt, the effect that the backlash can be smaller the fewer teeth there are in a wheel would result. This contrasts with the further effect that the curvature of the belt in the wrapping of the pulley wheel modifies the truly decisive meshing pitch at the crown circle such that the air gap should accordingly be larger the fewer teeth there are in the wheel.

Accordingly, the configuration according to the second embodiment is provided, on account of which an additional modification which takes into account the difference in curvature between the small and the large toothed pulley is present for the smaller of the two pulleys. The curvature that is vulcanized/frozen by the mold drum and is thus predefined is thus already present in the production of the toothed belt, while two further curvatures that differ from the former are created in operation and in the wrapping on the toothed pulleys.

The influence of these three dissimilar curvatures per the second embodiment is represented by the tooth counts of the small and the large toothed pulley, and by the tooth count of the belt for the influence by way of the production of the latter on account of the term carried over from the first embodiment which applies to be standard backlash and to both pulleys. Surprisingly, by way of the configuration of the invention disclosed with respect to the first and second embodiments, a particularly low-noise configuration of a toothed belt drive is attained even with toothed belts produced in a standard manner.

Figure 4:
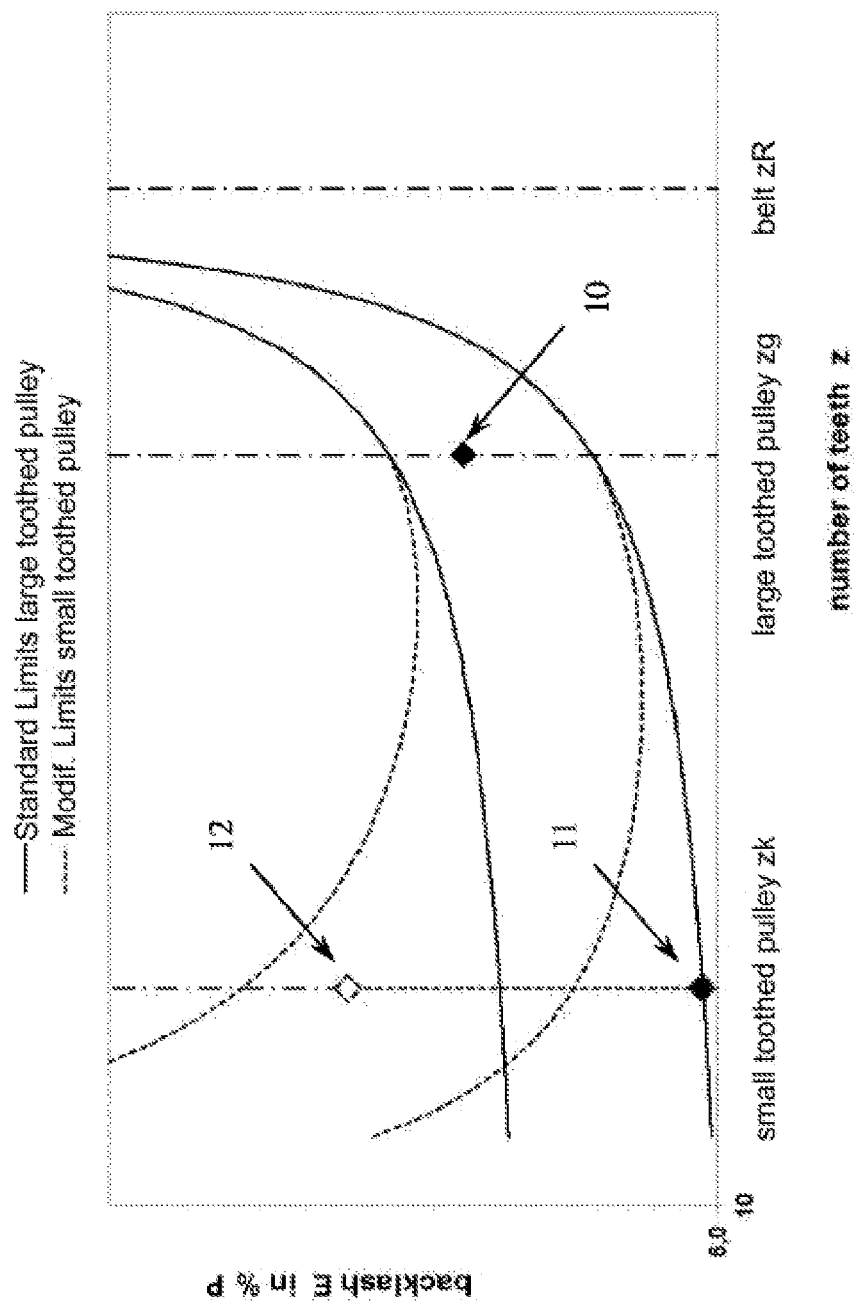
FIG. 4 shows a variates diagram for the tooth play/the backlash configured according to the invention, plotted over the tooth count; and, FIG. 5 shows a diagram of the reduction in noise achievable in quantitative terms in the case of a configuration of a belt drive according to the invention.

FIG. 4 shows the abovementioned opposing effects in a respective variates diagram. The tooth play/the backlash herein is plotted over the tooth count. The solid lines represent the variates range which results within the limits predefined by the constant $C_S$ in the case of a configuration of the backlash according to the first embodiment. The chain-dotted lines represent the variates range which results with the constants $C_S$ and $C_{mk}$ in the case of a corresponding configuration according to the second embodiment.

The difference between the individual configurations as per the first and second embodiments can also be very well highlighted by way of FIG. 4. The design point, or the variates pair 10, respectively, shows the configuration of the backlash in the case of a toothed pulley of a comparatively large diameter/higher tooth count as per the first embodiment, wherein the generation of noise when meshing has been successfully reduced here.

However, if a toothed pulley of a smaller diameter/lower tooth count according to the configuration according to the first embodiment were to be configured, the design point/variate pair 11 (less backlash) would result. However, the generation of noise when meshing in the smaller wheel could not be reduced in the case of this constellation. This is only possible once a design according to a configuration as is disclosed with respect to the second embodiment is performed. By way of such a configuration an air gap according to the variates pair/design point 12 (larger backlash) is achieved. A significant reduction in noise is thus achieved.

Figure 5:
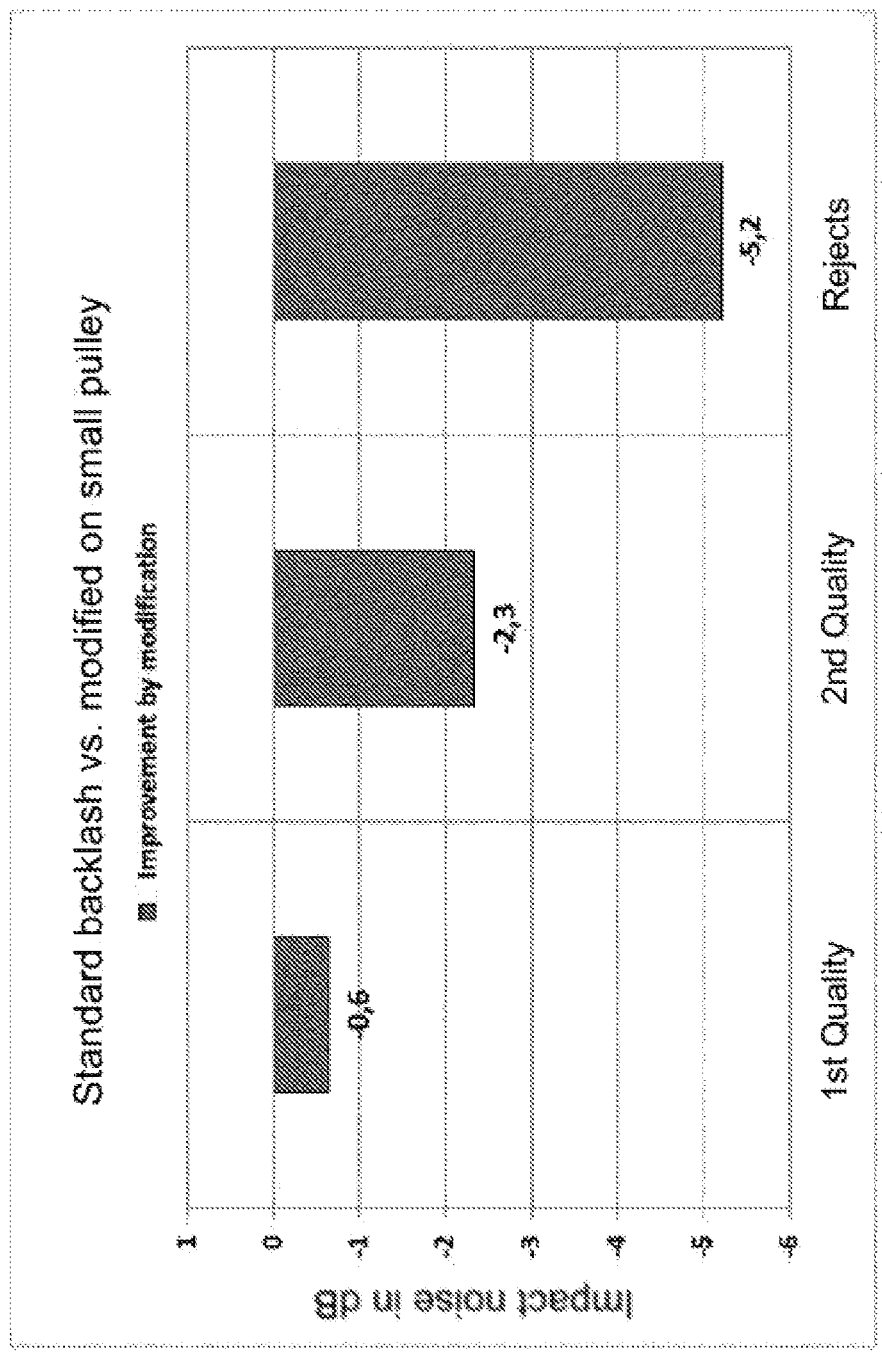

FIG. 5 shows the attainable reduction in noise in the case of a configuration of a belt drive according to the invention as per FIG. 1 also in a purely quantitative manner. Various toothed belts which had already been subjected to a prior noise test under normal conditions, thus tested using commonplace toothed pulleys from the prior art, were provided for the investigation. These prior tests led to the tested toothed belts being grouped in various quality classes in relation to the emission of noise, specifically in a "1st quality" class, in a "2nd quality" class, and a "wastage" class.

These belts were then tested again in terms of the emission of noise, but this time in a belt drive in which the respective smaller toothed pulleys were configured according to the invention, the backlash thereof having been modified specifically according to the second embodiment.

The graph in FIG. 5 shows the improvement in terms of the emission of noise that has been achieved on account thereof. This resulted in a reduction in the impact noise by up to 5.2 dB.

Such a serious reduction in noise under normal criteria corresponds to the spacing in the noise behavior between "1st quality" and "wastage". Accordingly, belts which with a view to the noise behavior thereof were previously to be classified as wastage, by way of the configuration of a toothed belt drive/toothed pulley according to the invention can again be reclassified to such an extent that the belts in terms of the emission of noise can still be used as quality products. This clearly shows that the configuration of a toothed belt drive according to the invention, or of the toothed pulleys thereof and the backlash of the latter causes a significant improvement in the emission of noise of toothed belt drives even in the case of standardized toothed belts.

It is understood that the foregoing description is that of the preferred embodiments of the invention and that various changes and modifications may be made thereto without departing from the spirit and scope of the invention as defined in the appended claims.

LIST OF REFERENCE SIGNS

Part of the Specification

1 Toothed belt drive
2 Toothed belt
3 Toothed pulley (output drive pulley)
4 Toothed pulley (input drive pulley)
5 Run-in region
6 Radius of the cord center
7 Crown circle radius of the sprocket (small toothed pulley)
8 Radius of mean tooth height
9 Root circle radius of the sprocket (small toothed pulley)
10 Pair of variates/design point for backlash
11 Pair of variates/design point for backlash
12 Pair of variates/design point for backlash

What is claimed is:

1. A toothed belt drive comprising:
a toothed belt having a plurality of teeth and at least one drive side provided with a first toothed profile;
at least two toothed pulleys each having a circumference and defining tooth gaps;
said toothed pulleys each having a second toothed profile that is complementary to said first toothed profile;
said toothed belt being configured to wrap said at least two toothed pulleys over a part-region of the circumference of each of said at least two toothed pulleys;
said teeth of said toothed belt being configured to mesh in said tooth gaps of said at least two toothed pulleys;
wherein an air gap ($E_S$) that relates to a nominal pitch (P) and results from a difference between a width ($e_S$) of the tooth gaps of the respective one of said at least two toothed pulleys and a width ($e_R$) of said teeth of said toothed belt at a mean height of said teeth, depending on a tooth count ($z_R$) of said toothed belt and on a tooth count ($z$) of said respective one of said at least two toothed pulleys, is configured such that $$E_S = e_S - e_R = \left[ C_S + \frac{0.004 \cdot z}{z_R - z} \right] \cdot P$$

wherein ($C_S$) is predefined as a constant for a standard backlash in the case of toothed belt drives in a range of $0.06 \leq C_S \leq 0.08$.

2. The toothed belt drive of claim 1, wherein one of said at least two toothed pulleys has a pitch circle diameter of (d)≤45 mm.

3. The toothed belt drive of claim 1, wherein one of said at least two toothed pulleys has a tooth count between 20 and 60.

4. The toothed belt drive of claim 1, wherein said at least two toothed pulleys are helically geared.

5. A toothed belt drive comprising:
a toothed belt having a plurality of teeth and at least one drive side provided with a first toothed profile;
at least two toothed pulleys each having a circumference and defining tooth gaps;
said at least two toothed pulleys each having a second toothed profile that is complementary to said first toothed profile;
said toothed belt being configured to wrap said at least two toothed pulleys over a part-region of the circumference of each of said at least two toothed pulleys;
said teeth of said toothed belt being configured to mesh in said tooth gaps of said at least two toothed pulleys;
wherein said at least two toothed pulleys have dissimilar diameters and include a smaller toothed pulley and a larger toothed pulley; and, at said smaller toothed pulley an air gap ($E_{S(mk)}$) that relates to a nominal pitch (P) and results from a difference between a width ($e_{Smk}$) of said tooth gaps of said smaller toothed pulley and a width ($e_R$) of said teeth of said toothed belt at a mean height of said teeth, depending on a tooth count ($z_R$) of said toothed belt and on a tooth count ($z_k$) of said smaller toothed pulley and on ($z_g$) of said larger toothed pulley, is configured such that:

$$E_{S(mk)} = e_{Smk} - e_R = \left[ C_S + \frac{0.004 \cdot z}{z_R - z_k} + \left( \frac{z_g}{z_k} - 1 \right) \cdot \frac{C_{mk} \cdot 2\pi \cdot u}{P \cdot z_g - 2\pi u} \right] \cdot P$$

wherein ($C_S$) is predefined in a range of $$0.06 \leq C_S \leq 0.08$$

and ($C_{mk}$) is predefined as a modified constant for said air gap in the case of toothed belt drives in a range of $$1.00 \leq C_{mk} \leq 2.00.$$

6. The toothed belt drive of claim 5, wherein said smaller toothed pulley has a pitch circle diameter of (d)≤45 mm.

7. The toothed belt drive of claim 5, wherein said smaller toothed pulley has a tooth count between 20 and 60.

8. The toothed belt drive of claim 5, wherein said at least two toothed pulleys are helically geared.

9. A toothed pulley for use in a toothed belt drive having a toothed belt provided with a first toothed profile including teeth, the toothed pulley comprising:
- a toothed pulley body having a circumference and teeth defining tooth gaps therebetween;
- said toothed pulley body having a second toothed profile that is complementary to the first toothed profile;
- said toothed pulley body being configured to have the toothed belt wrapped over a part-region of the circumference of said toothed pulley body;
- said toothed gaps being configured to have the teeth of the toothed belt mesh therein; and,
- wherein a backlash of said toothed pulley body is configured such that an air gap ($E_S$) that relates to a nominal pitch (P) and results from a difference between a width ($e_S$) of the tooth gaps of said toothed pulley body and a width ($e_R$) of the teeth of the toothed belt at a mean height of said teeth, depending on a tooth count ($z_R$) of the toothed belt and on a tooth count (z) of said toothed pulley body, is configured such that $$E_S = e_S - e_R = \left[ C_S + \frac{0.004 \cdot z}{z_R - z} \right] \cdot P$$

wherein ($C_S$) is predefined as a constant for a standard backlash in the case of toothed belt drives in a range of $$0.06 \leq C_S \leq 0.08.$$

10. The toothed pulley of claim 9, wherein the toothed belt drive is of an electric steering gear.

11. An electric power steering gear for motor vehicles comprising:
- a toothed belt drive including a toothed belt having a plurality of teeth and at least one drive side provided with a first toothed profile;
- said toothed belt drive further including at least two toothed pulleys each having a circumference and defining tooth gaps;
- said toothed pulleys each having a second toothed profile that is complementary to said first toothed profile;
- said toothed belt being configured to wrap said at least two toothed pulleys over a part-region of the circumference of each of said at least two toothed pulleys;
- said teeth of said toothed belt being configured to mesh in said tooth gaps of said at least two toothed pulleys;
- wherein an air gap ($E_S$) that relates to a nominal pitch (P) and results from a difference between a width ($e_S$) of the tooth gaps of the respective one of said at least two toothed pulleys and a width ($e_R$) of said teeth of said toothed belt at a mean height of said teeth, depending on a tooth count ($z_R$) of said toothed belt and on a tooth count (z) of said respective one of said at least two toothed pulleys, is configured such that $$E_S = e_S - e_R = \left[ C_S + \frac{0.004 \cdot z}{z_R - z} \right] \cdot P$$

wherein ($C_S$) is predefined as a constant for a standard backlash in the case of toothed belt drives in a range of $$0.06 \leq C_S \leq 0.08.$$

\* \* \* \* \*